(12) United States Patent
Dorsey et al.

(10) Patent No.: US 7,231,213 B2
(45) Date of Patent: Jun. 12, 2007

(54) METHOD TO DETECT A USER EQUIPMENT STUCK ON A DEDICATED CHANNEL

(75) Inventors: Donald A. Dorsey, Vernon Hills, IL (US); Ravi Gopalakrishnan, Mundelein, IL (US); Chandra K. Punyapu, Mundelein, IL (US); Padmaja Putcha, Gurnee, IL (US); Sharada Raghuram, Buffalo Grove, IL (US); Li Su, Grayslake, IL (US); Ramesh Sudini, Lake Zurich, IL (US)

(73) Assignee: Motorola Inc., Schaumburg, IL (US)

( * ) Notice: Subject to any disclaimer, the term of this patent is extended or adjusted under 35 U.S.C. 154(b) by 132 days.

(21) Appl. No.: 11/172,313

(22) Filed: Jun. 30, 2005

(65) Prior Publication Data

US 2007/0004417 A1 Jan. 4, 2007

(51) Int. Cl.
*H04Q 7/20* (2006.01)
(52) U.S. Cl. .................. 455/445; 455/423; 455/67.11; 455/450; 455/436; 455/437; 370/437; 370/310
(58) Field of Classification Search .............. 455/423, 455/67, 450, 436, 437, 404.1; 370/437
See application file for complete search history.

(56) References Cited

U.S. PATENT DOCUMENTS

| 6,088,343 | A | 7/2000 | King et al. | |
| 6,963,745 | B2* | 11/2005 | Singh et al. | 455/437 |
| 2001/0018342 | A1* | 8/2001 | Vialen et al. | 455/423 |
| 2003/0139184 | A1* | 7/2003 | Singh et al. | 455/436 |
| 2005/0054298 | A1* | 3/2005 | Chen | 455/67.11 |
| 2005/0090224 | A1* | 4/2005 | Dorsey et al. | 455/404.1 |
| 2005/0141541 | A1* | 6/2005 | Cuny et al. | 370/437 |
| 2006/0035642 | A1* | 2/2006 | Farnsworth et al. | 455/450 |

OTHER PUBLICATIONS

Erik Dahlman, Per Beming, Jens Knutsson, Fredrik Ovesjo, Magnus Persson, and Christiaan Roobol; "WCDMA—The Radio Interface for Future Mobile Multimedia Communications"; IEEE Transactions on Vehicular Technology, Nov. 1998; pp. 1105-1118; vol. 47, No. 4.
3GPP TS 34.109 V3.10.0 (Sep. 2004); 3rd Generation Partnership Project; Technical Specification Group Radio Access Network; Terminal logical test interface; Special conformance testing functions (Release 1999) pp. 1-4 and 12-20.
3GPP TS 24.008 V6.7.0 (Jan. 2005); 3rd Generation Partnership Project; Technical Specification Group Core Network; Mobile radio interface Layer 3 specification; Core network protocols; Stage 3 (Release 6) pp. 1-22, 34-100, 200-217, and 227-307.
3GPP TS 25.331 V6.3.0 (Sep. 2004); 3rd Generation Partnership project; Technical Specification Group Radio Access Network; Radio Resource Control (RRC); Protocol Specification (Release 6) pp. 1-25, 36-40, 145-220, 343-244, 361-363.
Kari Heiska, UMTS Architecture, protocols and logical Channels; Jan. 1, 2002.
Operation Interface Standard Specification for the Intra-Train Communication Unit (ITCU) S-4340 Revision: Draft 0.3 Jul. 22, 1999.
AMD; Am79C98 Twisted-Pair Ethernet Transceiver (TPEX) May 1994.

* cited by examiner

*Primary Examiner*—Joseph Feild
*Assistant Examiner*—David Q. Nguyen
(74) *Attorney, Agent, or Firm*—Sylvia Chen

(57) ABSTRACT

While engaged in a dedicated channel, a User Equipment (UE) may get stuck on it. A method and the computer program product detects whether the UE is stuck on the dedicated channel (202). When it is detected that the UE is stuck, the UE or the corresponding network in which the dedicated channel is located carries out a local release of the UE from the dedicated channel (204), and the UE is placed in idle mode (206). Locally releasing the UE from the dedicated channel curtails unnecessary battery consumption in the UE and limits wastage of network resources and bandwidth.

18 Claims, 3 Drawing Sheets

METHOD TO DETECT A USER EQUIPMENT STUCK ON A DEDICATED CHANNEL

FIELD OF THE INVENTION

This invention relates in general to communication networks. More specifically, the invention relates to the release of a User Equipment (UE) stuck on a dedicated channel.

BACKGROUND OF THE INVENTION

Existing wireless communication systems include a User Equipment (UE), a Radio Access Network (RAN), and a Core Network (CN). The UE may be connected to the CN through a dedicated channel. The dedicated channel may be used for operations including circuit-switched voice transfer, packet-switched voice transfer or data transfer. In the Wideband Code Division Multiple Access (WCDMA) network, CELL-DCH state refers to the state in which the UE is engaged in the dedicated channel. In the Global System for Mobile Communications (GSM) network, the Traffic Channel (TCH) state refers to the state in which the UE is on a dedicated channel. The GSM network uses the TCH channel for the transfer of voice, circuit-switched data and circuit-switched related signaling.

While it is engaged in a dedicated channel, however, a UE may get stuck on the dedicated channel. This may happen due to an error or a fault in at least one UE, RAN and CN. When the UE is stuck on the dedicated channel, the UE and the RAN keep performing actions that are necessary to maintain the channel. For the WCDMA Radio Access Technology (RAT), the actions include UEs sending MEASUREMENT REPORT messages and RANs sending MEASUREMENT CONTROL messages and ACTIVE SET UPDATE messages on the relevant Radio Bearers (RBs). In spite of the UE and the RAN performing the necessary actions, no useful data is exchanged between the UE and the CN for a significant period of time. In other words, there is no higher layer signaling and no data transfer over non-signaling RBs carrying user data or voice.

When stuck on the dedicated channel, the UE can suffer from several problems. First, battery consumption is high in a UE stuck on the dedicated channel. The dedicated channel is the highest battery consumption mode for the UE. In the dedicated channel, the UE continually monitors the downlink and transmits on the uplink. Second, this situation also results in the wastage of network resources. Maintaining a dedicated channel for the UE requires a significant amount of RAN resources and bandwidth. When the UE is stuck on the dedicated channel, these RAN resources and bandwidth are wasted, without any useful data being exchanged.

BRIEF DESCRIPTION OF THE DRAWINGS

The present invention is illustrated by way of example and not limitation in the accompanying figures, in which like references indicate similar elements, and in which.

Figure 1:
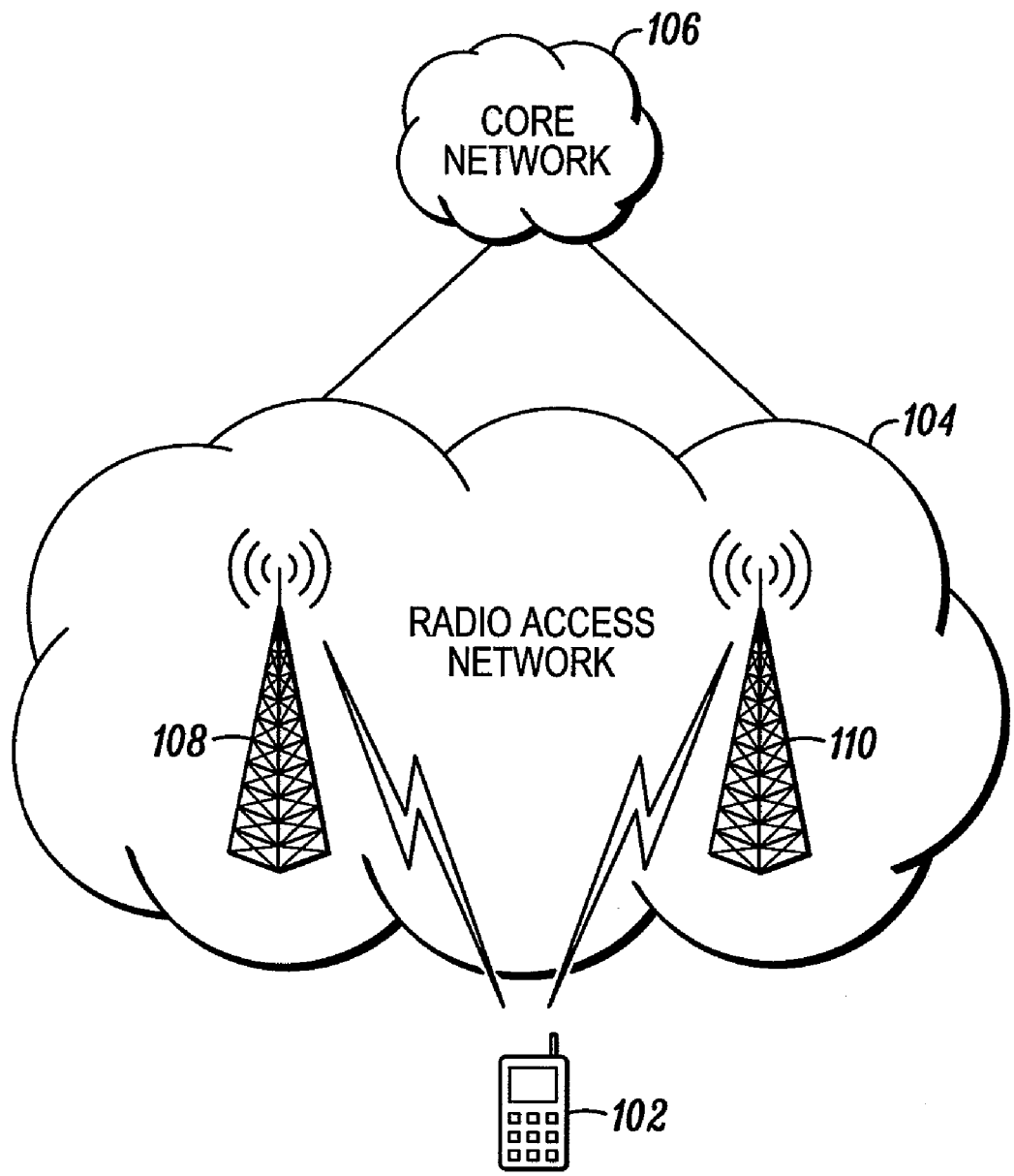
FIG. 1 shows a block diagram illustrating an exemplary wireless communication system, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE EMBODIMENTS

Various embodiments of the present invention provide a method and a computer program product for resource utilization in a User Equipment (UE). When engaged in a dedicated channel, the UE may get stuck on it. The method and the computer program product detects whether the UE is stuck on the dedicated channel. When it is detected that the UE is stuck on the channel, either the UE or the corresponding network carries out a release of the UE from the dedicated channel. This is done by performing a local release of the dedicated channel's radio resources alone or through executing a fatal error routine.

Before describing in detail the method of detecting and releasing a User Equipment stuck on a dedicated channel, it should be observed that the method can be implemented using software and/or circuitry in combination with conventional UE software and hardware. Accordingly, the method steps have been represented where appropriate by conventional symbols in the drawings, showing only those specific details that are pertinent so as not to obscure the disclosure with details that will be readily apparent to those of ordinary skill in the art having the benefit of the description herein.

FIG. 1 shows a block diagram illustrating an exemplary wireless communication system 100, in accordance with an embodiment. The wireless communication system 100 includes a User Equipment (UE) 102, a Radio Access Network (RAN) 104, and a Core Network (CN) 106. The UE 102 is sometimes also referred to as a Mobile Station (MS). Examples of the UE 102 include a cellular phone, a laptop computer, a Personal Digital Assistant (PDA), and so forth. The wireless communication system 100 may include a plurality of UEs. In this description, the wireless communication system 100 only shows a single UE 102.

The UE 102 manages communications links with the CN 106 through the RAN 104. The RAN 104 includes base stations 108 and 110. The base stations 108 and 110 are wireless transmitting and receiving stations for the wireless communication system 100. The CN 106 further manages communications links between the UE 102, and fixed or mobile communication networks. Examples of fixed networks include a public-switched telephone network (PSTN), an Integrated Services Digital Network (ISDN), and the Internet. An example of a mobile network is a Public Land Mobile Network (PLMN).

Figure 2:
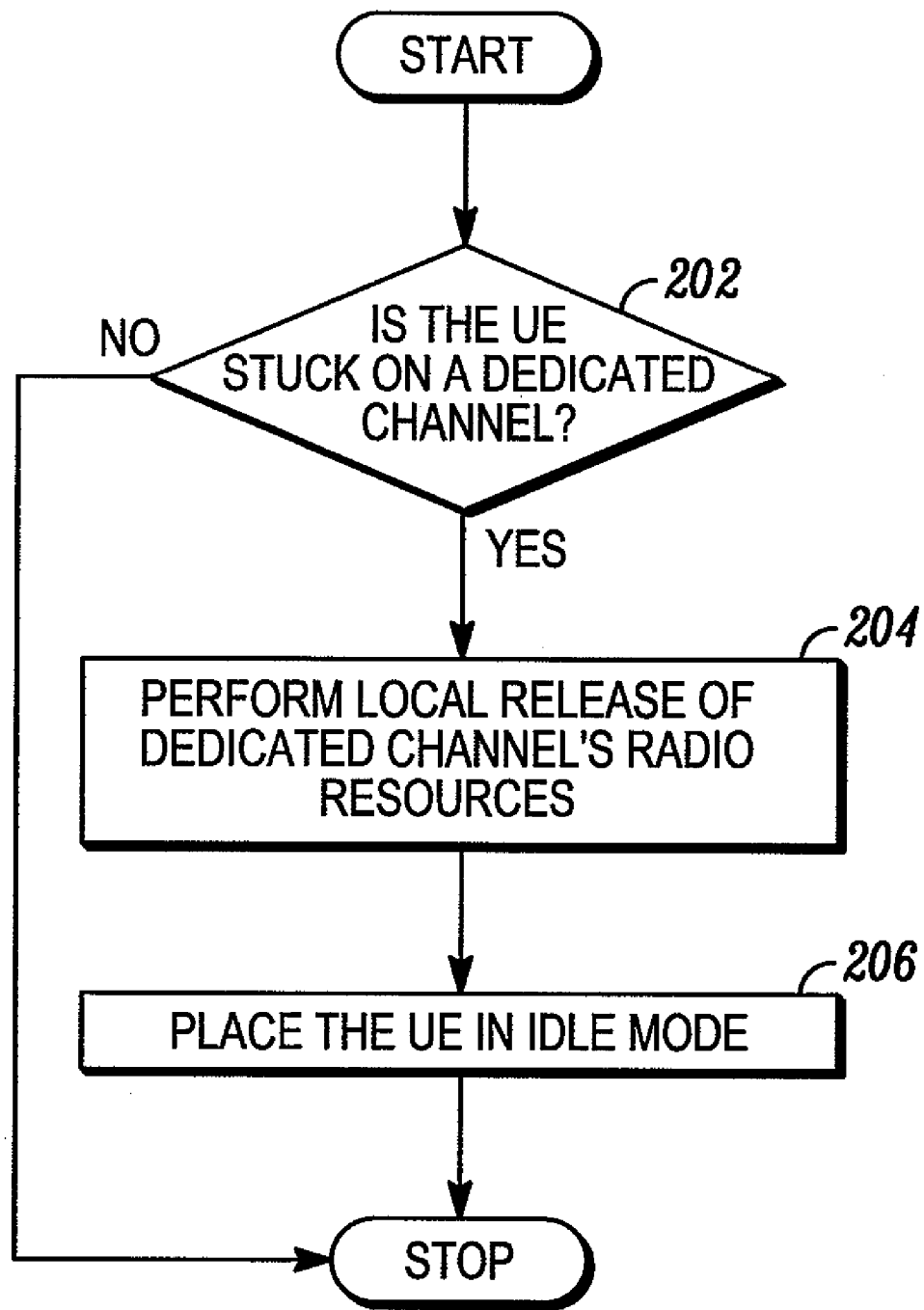
FIG. 2 shows a flowchart illustrating steps involved in utilizing the resources of a User Equipment (UE) stuck on a dedicated channel, and of the corresponding network, in accordance with an embodiment.

FIG. 2 shows a flowchart 200 illustrating steps involved in utilizing the resources of a User Equipment (UE) stuck on a dedicated channel, and of the corresponding network, in accordance with an embodiment. Step 202 determines whether the UE 102 is stuck on the dedicated channel. In one embodiment, the dedicated channel is accessed in a Wideband Code Division Multiple Access (WCDMA) network while the UE is in a CELL_DCH state. In another embodiment, the UE 102 is engaged in a dedicated channel while in a Traffic Channel (TCH) state in the GSM network.

The UE 102 may get stuck on the dedicated channel while performing the General Packet Radio Service (GPRS) attach operation on WCDMA network. The UE 102 may set the 'follow on request flag' in the GPRS Attach message, which it sends to the CN 106 to indicate that it has additional data to send after the attach operation is complete. The UE 102 may then fail to send any additional data afterwards. If this occurs, the UE 102 may get stuck on the dedicated channel.

The UE 102 may also get stuck on the dedicated channel in WCDMA after failing to release a Circuit Switch (CS) signalling connection, once the transactions associated with the CS signalling connection are complete. Similarly in WCDMA, the UE 102 may get stuck on the dedicated channel after failing to release a Packet Switch (PS) signalling connection once the transactions associated with the PS signalling connection are complete.

Finally, the UE 102 may get stuck on the dedicated channel if the corresponding WCDMA network fails to release a Radio Resource Control (RRC) connection once all signalling connections have been successfully released. Similarly, the UE 102 may get stuck on the dedicated channel if the corresponding GSM network fails to release a Radio Resource (RR) connection once all signalling connections have been successfully released. In addition to these specific examples, there may be other situations that present a risk of the UE 102 getting stuck on the dedicated channel.

In an embodiment, the UE 102 performs the step 202. In another embodiment, the RAN 104 triggers the UE to perform step 202. The RAN 104 may trigger the UE 102 to perform step 202 by broadcasting a message (which indicates that the check described in step 202 should be performed while the UE 102 is on the dedicated channel) to all, or a select group of UEs, in its coverage area. The trigger message may be sent as a system information message or as a device-specific message to individual UEs in its coverage area. In yet another embodiment, the RAN 104 performs the step 202 on its own, in which case no trigger needs to be sent to the UE.

Step 204 performs a local release of the radio resources when it is determined that the UE 102 is stuck on a dedicated channel. In one embodiment, the UE 102 performs the local release of the RRC connection. In another embodiment, a corresponding RAN 104 of the UE 102 performs the local release of the RRC connection. When the UE 102 performs a local release of the RRC connection, the release may be controlled by a Non Volatile Memory (NVM) field.

The NVM is a type of memory that retains its data even when the UE is switched off. Examples of NVM include Read-Only Memory (ROM), Programmable Read-Only Memory (PROM), and Erasable Programmable Read Only Memory (EPROM). The UE 102 performs the local release of the RRC connection based on a pre-defined value of a field in the NVM. If the field in the NVM contains a pre-defined first value is, for example, a 0 bit, then the local release of the RRC connection will be performed with little notice to the user of the UE. (Note that "first" is used solely to distinguish this value from another value introduced in the next paragraph).

If the field in the NVM contains a pre-defined second value, for example, a 1 bit, then the local release of the RRC connection will be performed according to a fatal error routine. A fatal error routine generally saves information regarding a failure of the UE (e.g., that the UE performed a local release due to a determination of being stuck on a dedicated channel, the time and date of the failure, etc.), forwards failure information to a remote server for analysis, and notifies the user of the UE (e.g., a tester) of the failure. The field of the NVM often contains a pre-defined second value when the UE is undergoing field testing, while the field of the NVM would often contain a pre-defined first value when the UE is a released product.

At step 206, after the RRC is released, the UE 102 is placed in an idle mode.

Figure 3:
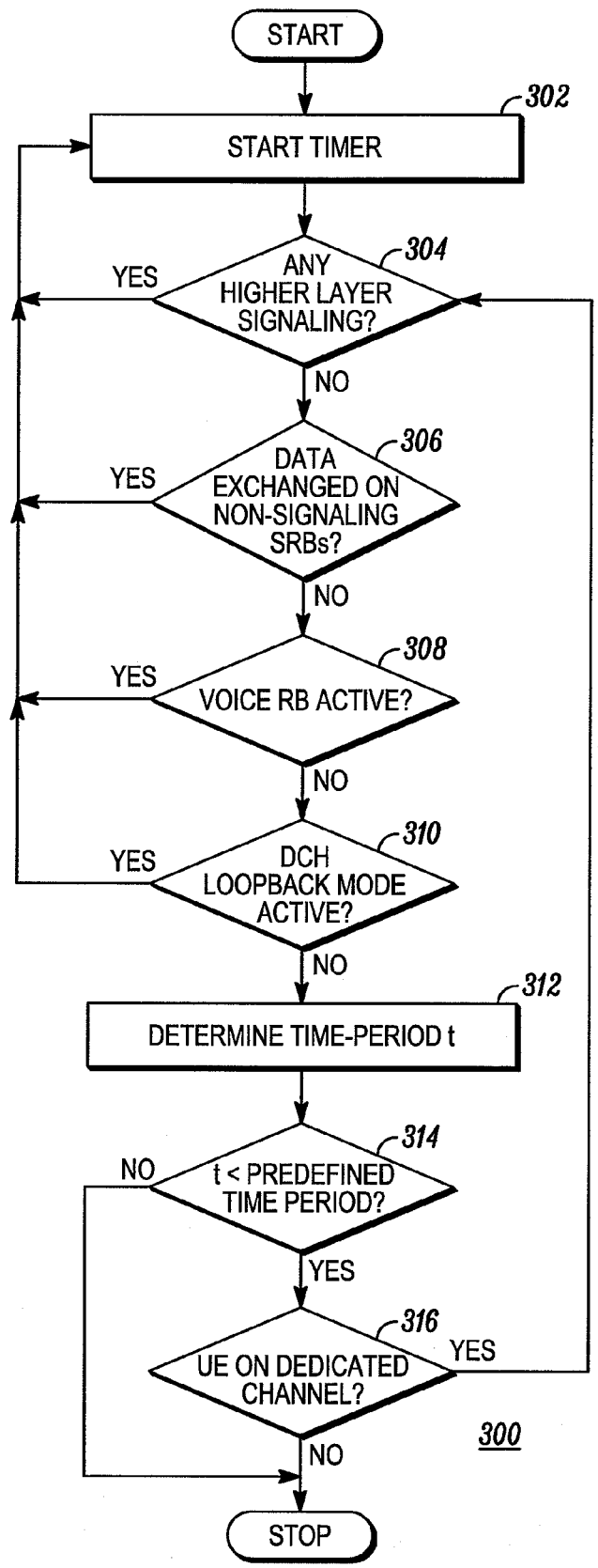
FIG. 3 shows a flowchart illustrating steps involved in determining whether the UE is stuck on a dedicated channel, in accordance with an embodiment.

FIG. 3 shows a flowchart 300 illustrating steps involved in determining whether the UE 102 is stuck on a dedicated channel, in accordance with an embodiment. This flowchart 300 provides details for implementing step 202 shown in FIG. 2.

At step 302, a timer is started. Step 304, determines whether the UE 102 is sending or receiving higher layer signaling messages. Examples of higher layer signaling messages for both the WCDMA and GSM networks include signaling performed by the Mobility Management (MM), General Packet Radio Service Mobility Management (GMM), Call Control (CC), Supplementary Services (SS), Short Message Service (SMS), and Session Management (SM) layers.

In a WCDMA implementation, WCDMA higher layer signaling messages are sent and received over a Signaling Radio Bearer 3 and a Signaling Radio Bearer 4. If the UE 102 is sending or receiving at least one of the higher layer signaling messages, then the flow returns to step 302. If the UE 102 is not sending or receiving any higher layer signaling messages, then the flow continues to step 306.

Step 306 determines whether the UE 102 is sending or receiving user data over non-signaling Radio Bearers (RBs). If the UE 102 is sending or receiving user data over non-signaling RBs, then the flow returns to step 302. If the UE 102 is not sending or receiving user data over non-signaling Radio Bearers (RBs), then the flow continues to step 308. Step 308 determines whether the UE 102 is sending or receiving signals over a voice RB. If the UE 102 is sending or receiving signals over a voice RB, then the flow returns to step 302. If the UE 102 is not sending or receiving signals over the voice RB, then the flow continues to step 310.

Step 310 determines whether a DCH Loopback Mode is active. The DCH Loopback Mode is a WCDMA test mode in UEs. A similar test mode is available for GSM networks and UEs. UEs with the test mode enabled on their Subscriber Identity Module (SIM) can be commanded to enter the DCH Loopback Mode by the corresponding network. The corresponding network commands the UE 102 to enter the DCH Loopback Mode through MM messages. The MM messages indicate when a test RB is to be activated, and also when the actual loopback of data sent on the test RB is to be enabled. When the DCH Loopback Mode is active, a downlink DCH data is looped back in the UE 102, and the looped back downlink DCH data becomes an uplink DCH data. When the DCH Loopback Mode is active, there is no guarantee about how often the corresponding network will send the useful data in this mode. Therefore, to determine that the UE 102 is stuck on the dedicated channel, the DCH Loopback Mode should be inactive. If the DCH Loopback Mode is active, then the flow returns to step 302. If the DCH Loopback Mode is not active, then the flow continues to step 312.

At step 312, a time period is determined from the timer that was started in step 302. At step 314, the determined time period is checked against a pre-defined time period. In an embodiment, the corresponding network controls the pre-defined time period by broadcasting information about the pre-defined time period to the UEs in its coverage area. The information about the pre-defined time period can be broadcast in a system information message. In another embodiment, the corresponding network controls the pre-defined time period by sending pre-defined time period information in a device-specific message to one or more UEs in its coverage area. The UE 102 receives this message if it lies within the coverage area of the RAN 104.

If the determined time period is more than the pre-defined time period, then it is ascertained that the UE 102 is stuck on the dedicated channel. If the determined time period is less than the pre-defined time period, then the flow goes to step 316.

Step 316 determines whether the UE 102 is still engaged in the dedicated channel. If the UE 102 is still engaged in the dedicated channel, then the flow returns to step 304. If the UE 102 is not engaged in the dedicated channel, it is determined that the UE 102 is not stuck on the dedicated channel.

In an embodiment, the UE 102 performs steps 302 through 316. In another embodiment, the corresponding RAN 104 performs the steps 302 through 316.

The method and computer program product for resource utilization in the UE 102 is applied in Radio Access Technologies (RATs) such as WCDMA and GSM, in accordance with various embodiments. It should be clear from the preceding disclosure that the method and a computer program product for resource utilization in a UE reduce unnecessary battery consumption in the UE. In addition, the method and computer program product limits wastage of network resources and bandwidth by releasing the UE stuck on the dedicated channel.

It will be appreciated the methods described herein may be comprised of one or more conventional processors and unique stored program instructions that control the one or more processors to implement, in conjunction with certain non-processor circuits, some, most, or all of the functions of the methods described herein. The non-processor circuits may include, but are not limited to, a radio receiver, a radio transmitter, signal drivers, clock circuits, power source circuits, and user input devices. As such, these functions may be interpreted as steps of a method to perform detection and release of a UE stuck on a dedicated channel. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein.

It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In this document, relational terms such as first and second, and the like may be used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The term "another", as used herein, is defined as at least a second or more. The terms "including" and/or "having", as used herein, are defined as comprising. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method of resource utilization in a User Equipment (UE) engaged in a dedicated channel comprising:
   determining that the UE is stuck on the dedicated channel, wherein the determining includes examining whether, for a pre-defined time period, the UE is (a) failing to send and receive higher layer signaling messages; (b) failing to send and receive user data over non-signaling Radio Bearers (RBs); (c) failing to send and receive signals over a voice RB; and (d) failing to determine that DCH Loopback Mode is active;
   performing a local release of radio resources of the dedicated channel; and
   placing the UE in an idle mode.

2. The method according to claim 1, wherein performing the local release comprises checking a field in a Non Volatile Memory (NYM).

3. The method according to claim 2, comprising:
   executing a fatal error routine when the field contains a pre-defined value.

4. The method according to claim 1, wherein the dedicated channel is accessed in a Wideband Code Division Multiple Access (WCDMA) network, and the UE is on the dedicated channel while in a CELL_DCH state.

5. The method according to claim 1, wherein higher layer signaling messages are sent and received over Signaling RB 3 and Signaling RB 4 in a Wideband Code Division Multiple Access (WCDMA) network.

6. The method according to claim 1, wherein a corresponding network controls the pre-defined time period by transmitting pre-defined time period information to at least one User Equipment in its coverage area.

7. The method according to claim 6 wherein the pre-defined time period information is broadcast in a system information message.

8. The method according to claim 6 wherein the predefined time period information is sent in a device-specific message to at least one User Equipment in its coverage area.

9. The method according to claim 1, wherein the UE performs the step of examining.

10. The method according to claim 1, wherein a corresponding network performs the step of examining.

11. The method according to claim 1, wherein the step of determining whether the UE is stuck on the dedicated channel is triggered by a corresponding network.

12. The method according to claim 11, wherein a corresponding network triggers the step of determining by transmitting a trigger to at least one User Equipment in its coverage area.

13. The method according to claim 12 wherein the trigger is broadcast in a system information message.

14. The method according to claim 12, wherein the trigger is sent in a device-specific message to at least one User Equipment in its coverage area.

15. The method according to claim 1 wherein the UE performs the local release.

16. The method according to claim 1 wherein a corresponding network performs the local release.

17. A computer program product for use with a computer, the computer program product comprising a computer usable medium having a computer readable program code embodied therein for resource utilization in a User Equipment (UE) engaged in a dedicated channel, the computer readable program code performing:
   determining that the UE is stuck on the dedicated channel, wherein the determining includes:
      staffing a timer;
      examining whether the UE is performing at least one of sending and receiving higher layer signaling messages;
      examining whether the UE is performing at least one of sending and receiving user data over non-signaling Radio Bearers;
      examining whether the UE is performing at least one of sending and receiving signals over a voice Radio Bearer (RB);
      examining whether DCH Loopback Mode is active; and
      determining a time period from the timer;
   performing a local release of radio resources of the dedicated channel; and
   placing the UL in an idle mode.

18. The computer program product according to claim 17, wherein the computer readable program code, while performing a local release of dedicated channel's radio resources, performing:
   executing a fatal error routine.

* * * * *